Dec. 11, 1951 F. P. GRUNKEMEYER 2,578,352
SHOOTING FLY SWATTER
Filed Jan. 10, 1950

Inventor:
FRANK P. GRUNKEMEYER,
By *Wm. L. Edmonston*
Attorney

Patented Dec. 11, 1951

2,578,352

UNITED STATES PATENT OFFICE 2,578,352

SHOOTING FLY SWATTER

Frank P. Grunkemeyer, Morris, Ind.

Application January 10, 1950, Serial No. 137,735

6 Claims. (Cl. 43—135)

The present invention relates to a fly swatter, and more particularly has reference to a fly swatter, which in addition to its conventional uses, may be employed to exterminate flies and the like at locations not easily accessible to the user.

Broadly, the invention includes a body portion, a handle secured to the body, a projecting means and a retrieving means connected to the handle and the projecting means to insure the return of the swatter to the user after it has been launched against the fly.

While it is appreciated that the idea of providing a fly swatter which can be projected is not broadly new, the prior devices have uniformly been of the type wherein a coil spring which surrounds the handle is the power source for the swatter. This assembly is not too desirable in that it requires an extremely long handle in order that the unit may reach remote points, such as the ceiling and this type of swatter presents packaging problems by reason of the enlarged nature of the unit. Furthermore in the case where the handle is of the customary length, there is no connection between the handle and the spring to return the fly swatter to the user.

An important object of my invention is to provide a fly swatter of the character described which will overcome the above and other objectionable features now present in the art.

A further object of the present invention is to provide a fly swatter of the projectable type which includes few essential working parts, which is positive and efficient in operation and which can be easily and inexpensively manufactured.

Yet another object of the invention is to provide a fly swatter which is provided with an elastic projecting means which will enable the swatter to be directed at the target in the manner of a "bean shooter," thereby affording extreme accuracy on the part of the user.

Still a further object of my invention is to provide a fly swatter wherein the body portion is pivotally connected to the handle to enable the body to be securely held at right angles to the handle during use and yet permit the handle and body to be maintained in parallel relationship when not in use to facilitate shipment and storage of the unit.

And yet another object is to provide a fly swatter of the character described wherein an elastic element connects the projector and swatter to afford a considerable range of action and also return the swatter to the user.

The foregoing and other objects of the invention as well as the advantages thereof will hereinafter become more apparent with reference to attached drawings and the specification.

In the drawings, which are illustrative of the preferred embodiment of the invention and in which similar reference characters denote the same or corresponding parts:

Figure 1:
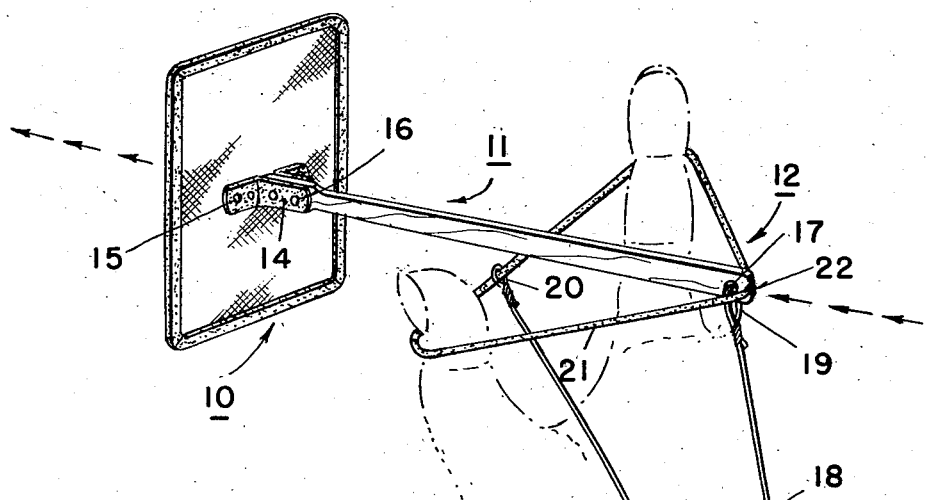
Figure 1 is a view in perspective of the fly swatter in position to be projected by the fingers of the user.

As shown in Figure 1, the fly swatter comprises a body portion 10, a handle 11, a projecting means 12 and a retrieving means 13 intermediate the projecting means and the handle. The body portion 10 may be rubber, plastic, reinforced cloth or other suitable material and, while the body is illustrated as being rectangular in outline, obviously other shapes may be used. A pair of spaced flexible angle pieces 14 are secured by one of their flanges to the body by rubber rivets 15 and the other flanges extend outwardly from the body portion in spaced parallel relation. One end of the handle 11 is disposed between the flanges and is attached thereto by rubber rivets 16. As clearly indicated in Figure 1, the handle 11 will be maintained at right angles to the body portion 10, the purpose of which will later be more fully discussed.

The opposite or free end of the handle is formed with an aperture 17 and one end of the retrieving means 13 which is an elastic tethering cord or band 18 extends through the aperture and is affixed to the handle as shown at 19. The other end of the cord 18 is provided with a loop 20 and an elastic band 21 projects therethrough. The band 21 is in the nature of a closed loop and in lieu of the sliding connection between the band and the cord 18, it is possible to effect a fixed or stationary juncture between the respective elements.

In using the fly swatter, the band 21 is looped around the thumb and forefinger of one hand and notched end 22 of the handle 11 is placed against the rear portion of the loop with the handle resting upon the forward portion of the band for stabilization purposes. The rear portion of the loop is then grasped with the fingers of the other hand and pulled rearwardly the necessary distance to insure that the swatter will travel the distance required to kill the fly or other insect. The rear portion of the band is released, whereupon the swatter will be projected toward the fly, and by virtue of the fact that the body portion 10 is perpendicular to the handle 11, there is provided a relatively large striking area. After the fly swatter has reached the limit of its trajectory the elastic band 18 will return the swatter to the user for further use.

Instead of projecting the fly swatter in the manner above described it is also possible to secure suitably the band 21 to one of the fingers and grasp the handle 11 between the thumb and forefinger and throw the fly swatter at the object somewhat in the manner of hurling a spear or javelin. Of course, with this particular procedure it is not feasible to obtain the accuracy which is possible by projecting the swatter in the fashion of a "bean shooter."

Figure 2:
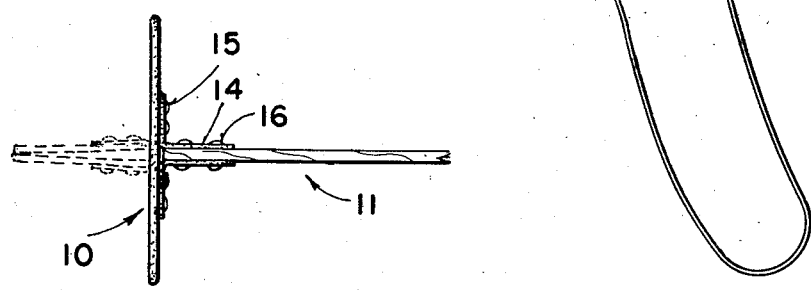
Figure 2 is a top plan view of the body portion showing its mode of attachment to the handle, the broken lines indicating the position of the body portion when the swatter is packed for shipment.

As previously pointed out, the fly swatter may be easily packaged for transportation or shipment and to accomplish this end, the body portion 10, by reason of its flexible characteristics, may be folded forwardly to the broken line position as illustrated in Figure 2 to enable the swatter to be inserted in a carton or other suitable type container or wrapper.

Figure 3:
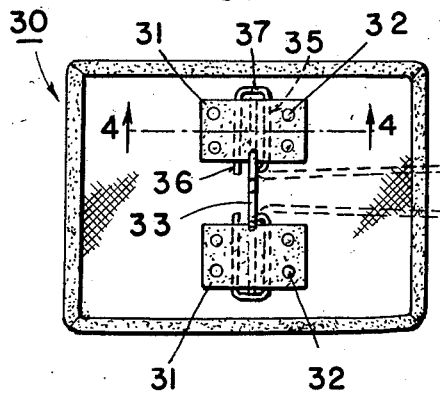
Figure 3 is a plan view of a modified construction wherein the handle is pivotally attached to the body portion.
Figure 4:
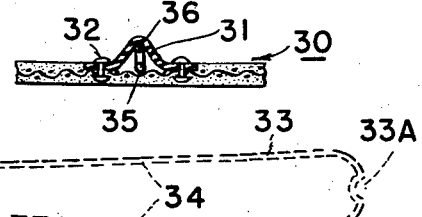
Figure 4 is a sectional view taken along the line 4—4 of Figure 3, the view looking in the direction of the arrows with the foot shown at right angles to the full line position of Figure 3.

A modified construction is shown in Figures 3 and 4 wherein the handle is pivotally attached to the body portion to facilitate shipping or storing of the fly swatter. In this embodiment it will be noted that body portion 30 is generally similar in structural detail to the body 10 of Figure 1 with the exception that a pair of elastic strips 31 are secured to one face of the body 30 in spaced parallel relationship. The strips may be attached by rivets, staples or the like 32.

A handle 33, which is composed of a length of wire or other resilient stock, is shaped to form a loop 33A at the outer end and a pair of legs 34 which converge at the opposite end. The inner or free end of each leg is bent outwardly at right angles to the leg as indicated at 35 and thence inwardly as shown at 36, thus forming in effect a U-shaped foot 37. Each U-shaped foot 37 may be inserted under each strip 31 by holding the handle 33 perpendicular with regard to the body portion 30 and by compressing the handle adjacent the feet 37, the closed end of each foot may be placed near the inner edge of the strips and when the handle is released the resiliency thereof will move the feet under the strips 31. In this position the strips 31 will maintain the handle perpendicular to the body portion so that the fly swatter may be projected and retrieved by means of the band 21 and the cord 18 described in connection with Figure 1.

To provide for easy shipment of the fly swatter the handle 34 is turned 90 degrees relative to the body portion, which movement can be accomplished by reason of the fact that the strips 31 will give or expand sufficiently when the feet 37 are turned to this angle.

It will be appreciated that I have provided a fly swatter assembly which includes a projecting means for accurately directing the swatter at the fly, together with means for retrieving or returning the swatter to the user. In addition, the projecting and retrieving means are such that the handle can be of the usual length and yet the swatter can be projected substantial distances due to the elasticity of the projecting and retrieving means. Furthermore, by having the body portion pivotally attached to the handle it is feasible to employ the swatter in the conventional manner, as well as projecting the fly swatter against the fly.

It is to be understood that slight changes can be made in the details of the invention without departing from the spirit hereof, and I do not limit the invention to the embodiments herein, except as I may be limited by the annexed claims.

What I claim is:

1. A fly swatter comprising a handle, a body portion mounted on one end of said handle at substantially right angles to the handle, an elastic member attached to the handle and an elastic loop secured to the elastic member whereby the placing of the handle against a portion of said elastic loop and placing said loop under tension will project the handle and body portion freely when the tension is released and the elastic member will return the swatter.

2. A fly swatter as claimed in claim 1 wherein said elastic member is attached adjacent the free end of said handle.

3. A fly swatter as claimed in claim 2 wherein the free end of said handle is provided with a notch for receiving a portion of the elastic loop.

4. A fly swatter as claimed in claim 1 wherein said body portion is rigidly supported by said handle.

5. A fly swatter comprising a body portion, a pair of spaced resilient strips secured to the body portion, a handle having foot portions secured between the strips and the body portion to maintain the handle at substantial right angles to the body portion, an elastic loop adapted to be supported by the fingers of the user, an elastic connection between the loop and the handle of the swatter whereby upon placing the end of the handle against the loop and tensioning the same the swatter may be projected and the elastic connection will return the same to the user.

6. A fly swatter comprising a body portion, a pair of spaced resilient strips of different material than the body portion secured to the body portion adjacent each end thereof to form loops, a handle, a pair of feet on said handle extending outwardly in opposite directions therefrom, each foot being located in the space defined by said body portion and resilient strip whereby said handle may be maintained in parallel relationship to said body portion or at right angles to said body portion.

FRANK P. GRUNKEMEYER.

REFERENCES CITED

The following references are of record in the file of this patent:

UNITED STATES PATENTS

| Number | Name | Date |
| --- | --- | --- |
| 118,108 | Cleaveland | Aug. 15, 1871 |
| 1,465,523 | Mangold | Aug. 21, 1923 |
| 2,151,242 | Souply | Mar. 21, 1939 |
| 2,264,787 | Barnett | Dec. 2, 1941 |